Figure 1:
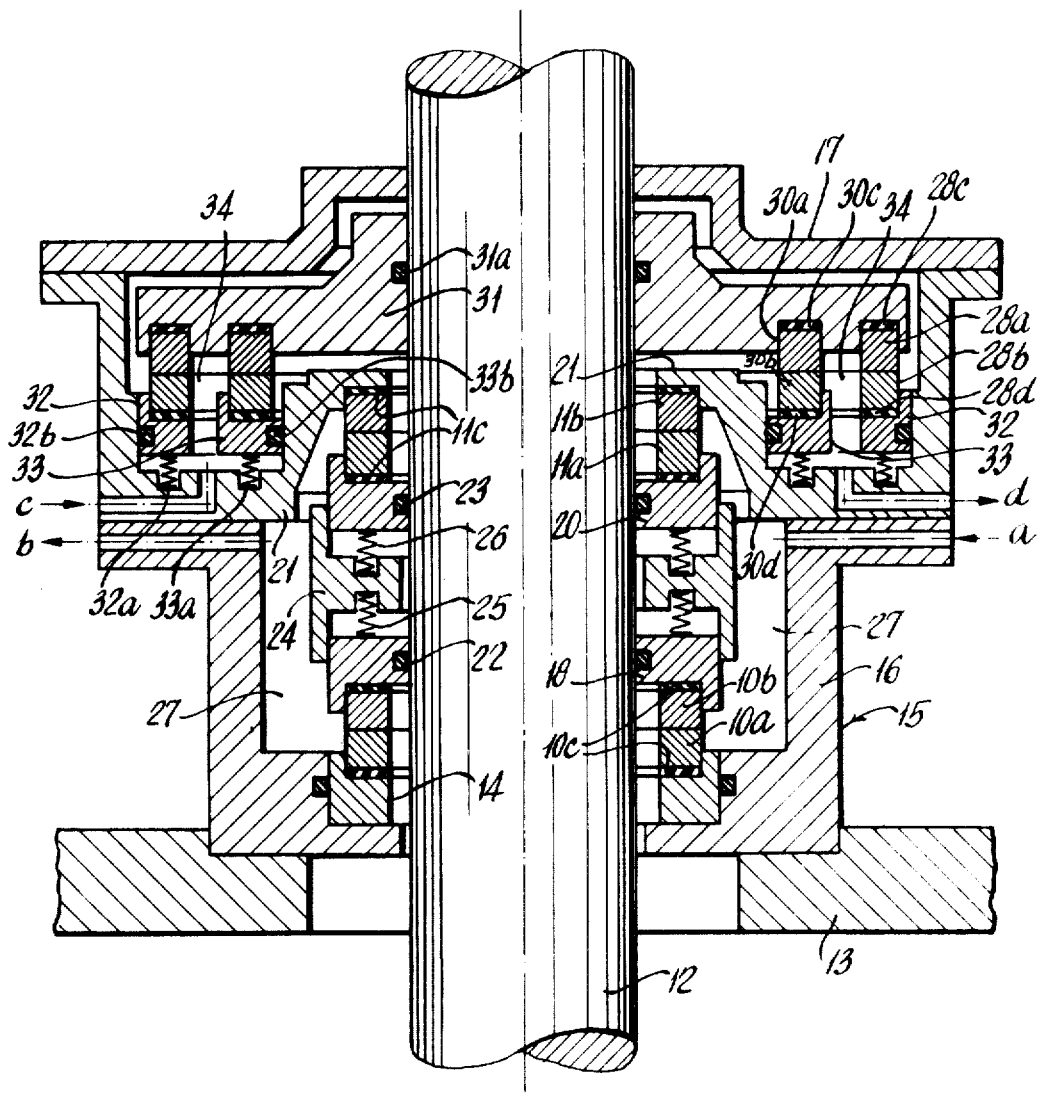

United States Patent

[11] 3,591,188

| [72] | Inventor | Joachim H. Eisner<br>Kaiserslautern, Upper Palotinate, Germany |
|---|---|---|
| [21] | Appl. No. | 852,259 |
| [22] | Filed | Aug. 22, 1969 |
| [45] | Patented | July 6, 1971 |
| [73] | Assignee | Eisenwerke G.m.b.H.<br>Kaiserslautern/Pfalz, Germany |
| [32] | Priority | Aug. 30, 1968 |
| [33] | | Germany |
| [31] | | P 17 75 593.0 |

[54] SLIDE RING SEAL FOR ROTATING SHAFTS
10 Claims, 2 Drawing Figs.

[52] U.S. Cl. ............................................. 277/9,
277/15, 277/62, 277/65, 277/74
[51] Int. Cl. ........................................ F16j 9/00,
F16j 15/38
[50] Field of Search ........................................ 277/9, 15,
61, 62, 65, 74

[56] References Cited
UNITED STATES PATENTS

| 2,710,205 | 6/1955 | Brkich............................ | 277/61 X |
| 2,917,330 | 12/1959 | Vanta | 277/9 |
| 3,260,530 | 7/1966 | Jelatis et al | 277/2 |
| FOREIGN PATENTS | | | |
| 941,241 | 11/1963 | Great Britain..... .......... | 277/9 |
| 1,330,862 | 5/1962 | France ............................ | 277/65 |

Primary Examiner—Samuel B. Rothberg
Attorney—Green & Durr

ABSTRACT: A shaft passing through a wall of a pump or the like device containing a fluid under pressure is sealed by means of two slide ring sealing units each comprised of two pairs of spring-loaded stationary and rotating sealing rings forming closed sealing chambers together with the adjoining walls of the units. The first or main sealing unit adjoining the device with its pairs of sealing rings axially spaced along the shaft is followed by the second standby units with its pairs of concentric sealing rings spaced radially and encompassing at least in part one of the pairs of rings of the first sealing unit. Sealing fluid under pressure is applied from a common source to both sealing chambers via conduit and valve means enabling a ready takeover of the standby unit upon failure of the main sealing unit.

PATENTED JUL 6 1971

3,591,188

SHEET 1 OF 2

INVENTOR
JOACHIM H. EISNER

BY   HARL RATH

ATTORNEY

SLIDE RING SEAL FOR ROTATING SHAFTS

The present invention relates to slide ring sealing arrangements for rotating shafts passing through a wall of a pump, stirring or the like device, more particularly, though not limitatively, of the type containing a corrosive fluid under pressure.

Slide ring sealing arrangements are known in the form of both single and -double-acting units. The latter normally comprise two slide ring pairs to the outside of which is applied a sealing fluid under pressure slightly in excess of the pressure in the device to be sealed, to prevent leakage of even minute amounts of fluid medium from the inside to the outside of the device. Normally, the two slide ring pairs are disposed one behind the other in axially spaced relation to the rotating shaft passing through a wall of the device being sealed.

There are known other slide ring sealing units of the type wherein the pairs of cooperating slide rings disposed concentrically and spaced radially in relation to the shaft to be sealed. Arrangements of this type, while being more sensitive than the units utilizing axially spaced slide ring pairs, have the disadvantage that the diameter of at least one of the outer slide ring pair is relatively large, whereby to result in increased leakage through as well as early wear of the rings. Furthermore, due to their different circumferential speeds, the wear of both pairs of slide rings is greatly different, the result of this and other drawbacks being reduced life and increased leakage caused by bearing clearance and bending of the rotating shaft under load, compared with sealing units utilizing axially spaced slide ring pairs.

In the use of pumps, stirring and the like devices containing a fluid under pressure, specially those used in the chemical industry, the necessity arises in practice to ensure a satisfactory seal even upon failure or breakdown of the sealing unit of the referred to type, in order to avoid any undue interruptions of the operations, because considerable losses and costs may be involved during sudden and prolonged interruptions of a chemical process. For this reason, it has already been proposed to provide a conventional stuffing box subject to sealing pressure and following a main slide ring sealing unit. Stuffing boxes have, however, the drawback, aside from other defects and shortcomings of both a practical and constructional nature, of requiring frequent adjustment or retightening of the packing material, making it impossible thereby to guarantee their full effectiveness and reliability at the very instant of a failure or breakdown of the main slide ring sealing unit.

A more favorable solution of the problem described in the foregoing and proposed in the past resides in the provision of two complete slide ring sealing units spaced in the axial direction, or disposed one behind the other, each of said units in turn comprising two axially spaced sealing ring pairs and sealing chambers. Such an arrangement has the disadvantage that the constructional length of the complete unit is increased considerably, that is, assuming a total length in excess of twice the length of a single unit.

Accordingly, among the objects of the present invention is the provision of s slide ring type sealing arrangement for rotating shafts of the referred to character, comprising a main sealing unit and an emergency or standby sealing unit, by which the foregoing and related difficulties and drawbacks of the prior arrangements are substantially overcome or minimized; which arrangement is both simple in construction and effective in operation; and which will enable a ready and substantially instant takeover by the standby unit upon failure or breakdown of the main sealing unit.

Figure 2:
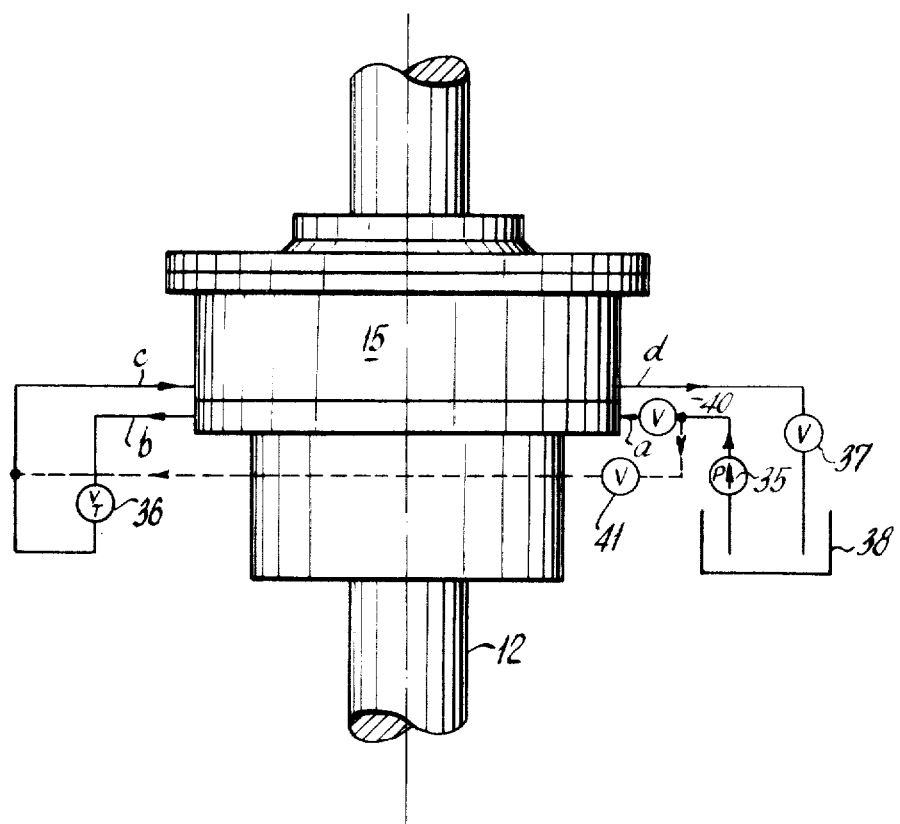

The invention, both as to the foregoing and ancillary objects as well as novel objects thereof, will be better understood from the following detailed description, taken in conjunction with the accompanying drawings forming part of this disclosure and in which:

FIG. 1 is a sectional view of a twin-unit sealing arrangement for rotating shafts of the referred to type constructed in accordance with the principles of the invention; and FIG. 2 is a combined outline of the device according to FIG. 1 and diagram showing the preferred sealing fluid distribution upon the main and standby sealing units according to the invention.

With the foregoing objects in view, the invention involves generally the provision of a slide ring sealing arrangement for rotating shafts of the referred to type, comprising essentially a fist or main sealing unit and a second or standby sealing unit, said first unit being comprised of two axially spaced slide ring pairs and said second unit being comprised of two concentric and radially spaced slide ring following and at least partly encompassing said first unit, to result in a compact double-acting sealing structure disposed in a common housing connected to the device (pump, etc.) to be sealed. The sealing chambers of both units are connected with a common source of sealing fluid under pressure through a valve distribution system designed to enable a ready takeover by the standby unit upon failure or breakdown of the main sealing unit, in a manner as will be further described in reference to the drawings as follows.

In FIG. 1, two axially spaced slide or sealing ring pairs are denoted by numerals 10a, 10b and 11a, 11b, respectively. Numeral 12 indicates the rotating shaft to be sealed being passed through a wall 13 forming part of a pump, stirring or the like device containing a fluid under pressure. All four slide rings 10a, 10b, 11a, and 11b are supported respectively by soft washers 10c and 11c placed between their respective stationary and rotating supporting members described in greater detail in the following.

More particularly, the slide ring 10a of the first of the axial pairs is supported by a ring-shaped stationary member 14 secured to the housing 15 of the device which consists of a cup-shaped part 16 supported by the wall 13 of the device to be sealed and a cover 17, while the cooperating slide ring 10b of the first pair is carried by the rotating support or member 18. Similarly, the slide ring 11a of the second of the axially spaced pairs is supported by a rotating support or member 20 and the slide ring 11b of the same pair is carried by an intermediate wall 21 of the housing 15. A ring 22 serves to seal the member 18 against the shaft 12, while allowing of axial displacement of the member. Similarly, a ring 23 serves to seal the member 20, while allowing of axial displacement thereof upon the shaft 12, for the purpose as will become more apparent as the description proceeds.

A ring-shaped member 24 of T-shaped cross section interposed between the members 18 and 20 and rotating with the shaft 12 serves for the mounting of a pair of compression springs 25 and 26 engaging the opposite faces of the center leg of the member 24, on the one hand, and engaging the members 18 and 20, on the other hand, in such a manner as to urge each of the slide ring pairs 10a, 10b and 11a, 11b into resilient frictional sealing engagement with one another, in the manner shown and readily understood by those skilled in the art.

As can be seen from FIG. 1, the slide ring pairs 10a, 10b and 11a, 11b are spaced by a predetermined distance in the axial direction such as to enclose a first or main sealing space or chamber 27 together with the walls 15 and 21 of the housing 15, to which chamber is applied a sealing medium (liquid, etc.) under pressure slightly above the pressure within the device to be sealed, whereby to substantially prevent leakage and to ensure a close and intimate seal by the sliding ring pairs 10a, 10b and 11a, 11b, respectively.

Disposed radially outwardly of an encompassing at least in part the upper ring pair 11a, 11b, of the axial sealing unit are two further concentric and radially spaced slide ring pairs 28a, 28b and 30a, 30b, forming an auxiliary or standby sealing unit as described in greater detail hereafter. Again, the rotating slide rings 28a, 30a, of the standby unit are supported by a common rotating support or member 31 via soft washers 28c and 30c, respectively, while the stationary rings 28b and 30b of said unit are supported by stationary and slidably mounted supporting members 32 and 33 via soft washers 28d and 30d, respectively.

Springs 32a and 33a interposed between the stationary support or wall 21 on the one hand, and the axially slidably mounted supporting members 32 and 33, on the other hand, serve to resiliently urge the rotating rings 28a and 30a against the stationary rings 28b and 30b, whereby to effect a close seal between the pairs of rings in substantially the same manner as in the case of the axially spaced pairs 10a, 10b and 11a, 11b of the main sealing unit. The rotating member 31 is sealed against the shaft by a ring 31a, while the slidable members 32 and 33 are sealed against the housing wall 21 by means of sealing rings 32b and 33b, respectively.

As a consequence, there is provided by the concentrically arranged slide ring pairs 28a, 28b and 30a, 30b a further closed sealing space or chamber 34 to which is applied a sealing fluid under pressure in the same manner as described in reference to the chamber 27 associated with the main ring pairs 10a, 10b and 11a, 11b.

The sealing chambers 27 and 34 of the main and standby sealing units, comprised respectively, of the axially and radially disposed slide ring pairs, are provided with suitable inlet and outlet ports or ducts for the application thereto of a sealing fluid under pressure, as indicated by arrows a, b and c, d in the drawing.

The function and operation of the device shown and described in the foregoing is as follows.

During normal operation, full sealing pressure is maintained with in the chamber 27 of the main unit, while substantially pressureless medium passes through the chamber 34 of the standby sealing unit. In other words, the more sensitive or standby sealing unit provided by the radially arranged slide ring pairs 28a 28b and 30a, 30b is not subjected to any load so as to be idling on under normal operating conditions. In case of a failure of either or both of the slide ring pairs of the main sealing units, which may be due to any reason whatsoever, sealing fluid under pressure is applied to the chamber 34 either manually or automatically, whereby the slide ring pairs 28a, 28b and 30a, 30b of the standby unit will now assume the sealing function to the end of the emergency or the next checkup or inspection, respectively.

A preferred way to initate the operation of the standby unit, upon failure of the main sealing unit, is illustrated diagrammatically in FIG. 2. Referring more particularly to the latter, the main sealing chamber 27 has applied to it, as indicated by the arrow a, sealing fluid under pressure supplied by a tank 38 via a pump 35 and valve 40. The fluid leaving the chamber 27 is passed, via a throttle valve 36, to the inlet of the sealing chamber 34 of the standby unit, as indicated by the arrows b and c, and returned to the tank 38 via a further valve 37. As a result of this interconnection of the sealing chambers 27 and 34, adequate fluid pressure is established in the chamber 27 controlled by the adjustment of the throttle valve 36, while the return flow of the fluid through the chamber 34 of the standby unit is substantially pressureless, to result in the inoperativeness or idling of the standby unit under normal operating conditions.

If now a failure or breakdown occurs of the main unit comprised of the slide rings 10a, 10b and 11a, 11b, the pressure in the chamber 27 is reduced to at least the pressure prevailing in the device (pump, etc., to be sealed. Under these conditions, the valve 37 is closed, either manually or automatically by suitable pressure-responding means associated with the chamber 27, to create a pressure buildup in the chamber 34 and operation of the standby sealing unit comprised of the slide ring pairs 28a, 28b and 30a, 30b.

A modification of the operation, as illustrated by the dotted lines in FIG. 2, involves the closing, upon failure or breakdown of the main sealing unit, of the valve 40 and the opening of a valve 41 inserted in a bypath from the pump directly to the inlet of the chamber 34. Simultaneously, the throttle valve 36 may be closed, to impress the full pressure upon the chamber 34 and to disconnect the sealing chamber 27.

In the foregoing, the invention has been described in reference to a specific illustrative and exemplary device. It will be evident that variations and modifications, as well as the substitution of equivalent parts or devices for those shown, may be made without departing from the broader scope and spirit of the invention.

I claim:

1. In combination with a closed device containing a fluid under pressure and including a rotating shaft passing through a wall thereof, a sealing arrangement for said shaft comprising in combination:
   1. a housing secured to said device and traversed by said shaft,
   2. an intermediate supporting wall of said housing traversed by said shaft,
   3. a main sealing unit comprised of two pairs of spring-loaded stationary and rotating sealing rings disposed in axially spaced relation within the space enclosed by said intermediate wall and the near end of said housing adjoining said device, whereby to provide a first closed sealing chamber by said pairs of rings and the adjacent housing walls,
   4. a standby sealing unit comprised of two pairs of spring-loaded and radially spaced concentric stationary and rotating sealing rings disposed within the space enclosed by said intermediate wall and the for end of said housing away from said device, whereby to provide a second closed sealing chamber by said last-mentioned pair of rings and the adjacent housing walls, and
   5. inlet and outlet means for each of said sealing chambers for the application thereto of a sealing fluid under pressure.

2. A sealing arrangement as claimed in claim 1, wherein said standby sealing unit encircles at least in part one of the adjacent pairs of sealing rings of said main sealing unit.

3. A sealing arrangement as claimed in claim 1, including conduit means to pass a sealing fluid under pressure through said main and standby sealing units in series.

4. A sealing arrangement is claimed in claim 1, including conduit means to pass a sealing fluid under pressure through said main and standby units in series, and a throttle valve inserted in the path of the fluid from the outlet of said main unit to the inlet of said standby unit.

5. A sealing arrangement as claimed in claim 1, including a sealing fluid reservoir, first conduit means including a pump and connecting said reservoir with the inlet of said first sealing chamber, second conduit means including a throttle valve and connecting the outlet of said first sealing space with the inlet of said second sealing chamber, and third conduit means including a control valve and connecting the outlet of said second sealing chamber with said reservoir.

6. A sealing arrangement as claimed in claim 5, including a further conduit directly connecting the output of said pump with the inlet of said second sealing chamber, and a pair of further control valves respectively, connected between the output of said pump and the inlet of said first sealing chamber and in series with said further conduit.

7. In combination with a closed device containing a fluid under pressure and including a shaft passing through a wall thereof, a sealing arrangement for said shaft comprising in combination:
   1. a main sealing unit adjoining said device and comprised of two pairs of spring-loaded stationary and rotating sealing rings disposed in axially spaced relation and forming a first closed sealing chamber with the adjoining walls of said unit,
   2. a standby sealing unit adjoining said first unit on the side thereof away from said device and comprised of two pairs of spring-loaded concentric stationary and rotating sealing rings disposed in radially spaced relation and forming a second closed sealing chamber with the adjoining walls of said standby unit, and
   3. inlet and outlet means for both said sealing chambers for the application thereto of a sealing fluid under pressure.

8. A sealing arrangement as claimed in claim 7, wherein said standby unit encircles at least in part the adjoining pair of rings of said main unit.

9. A sealing arrangement as claimed in claim 7, including conduit means to pass a sealing fluid through said first and second sealing chambers in series.

10. A sealing arrangement as claimed in claim 7, including conduit means to pass a sealing fluid through said first and second sealing chambers in series, and a throttle valve inserted in the path of the fluid from the outlet of said main unit to the inlet of said standby unit.